United States Patent [19] [11] 4,273,797
Akashi et al. [45] Jun. 16, 1981

[54] METHOD OF DETECTING PINHOLES IN A MAGNETIC RECORDING MEDIUM

[75] Inventors: Goro Akashi; Yasuyuki Yamada; Masaaki Fujiyama; Nobutaka Yamaguchi, all of Odawara, Japan

[73] Assignee: Fuji Photo Film Co., Ltd., Kanagawa, Japan

[21] Appl. No.: 30,538

[22] Filed: Apr. 16, 1979

Related U.S. Application Data

[63] Continuation of Ser. No. 835,662, Sep. 22, 1977, abandoned, which is a continuation of Ser. No. 364,264, May 29, 1973, abandoned.

[30] Foreign Application Priority Data

Jun. 2, 1972 [JP] Japan .................................. 47/55476

[51] Int. Cl.$^3$ ............................................... B05D 5/12
[52] U.S. Cl. ...................................... 427/10; 427/122; 427/128
[58] Field of Search ................ 428/900; 427/127–132, 427/48, 8, 10, 122; 118/712, 713

[56] References Cited

U.S. PATENT DOCUMENTS

| 3,484,286 | 12/1969 | Beck | 428/900 |
| 3,636,442 | 1/1972 | Doi | 118/712 X |
| 3,881,046 | 2/1975 | Akashi | 428/216 |

Primary Examiner—Bernard D. Pianalto
Attorney, Agent, or Firm—Gerald J. Ferguson, Jr.; Joseph J. Baker

[57] ABSTRACT

A magnetic recording medium comprising a plastic film support having a magnetic recording layer on one side is provided with a backing layer containing: (1) a white and/or light colored powder; (2) carbon black and/or graphite; and (3) a polymeric binder. The backing layer transmits more than 3% of white light at a thickness of 2 microns and has a surface electrical resistance of less than $10^{10}$ Ω/cm. Pinholes and drop-out are easily detected in forming such a magnetic recording medium.

6 Claims, No Drawings

METHOD OF DETECTING PINHOLES IN A MAGNETIC RECORDING MEDIUM

CROSS REFERENCE TO RELATED APPLICATION

This is a continuation of application Ser. No. 835,662, filed Sept. 22, 1977, which in turn, is a continuation of application Ser. No. 364,264, filed May 29, 1973, both now abandoned.

BACKGROUND OF THE INVENTION

1. Field of the Invention

The present invention relates to a magnetic recording medium for use as a video tape, audio tape, memory tape, etc.

The features of the present invention are as follows.

(1) The backing layer has turned white or light color, and the writing property or marking property is excellent as compared with a conventional black backing layer.

(2) Pinholes or drop-out in coating of a magnetizable layer can be detected with ease in the production step.

2. Description of the Prior Art

In general, a magnetic recording medium comprises a base having on the one side thereof a magnetizable layer and, on the opposite side, a backing layer. As the backing layer, graphite, carbon black, etc. are often used, depending upon the use of the tape.

A magnetic recording medium having such a structure can be used with no problems under usual conditions. However, there is room for improvement in such a tape in electrostatic adsorption of dust, unevenness at the edge surface of the wound tape and the like.

As a means to improve these defects, it has been known to provide a backing layer having a low electric resistance and a rough surface.

In general, the backing layer used at present for the above-described purposes (i.e., to prevent the electrostatic adsorption of dust and unevenness at the edge surface of the wound tape by reducing electric resistance and rendering the surface rough) in the magnetic recording medium having a structure as described mainly comprises a mixture of carbon black and an organic binder. Such backing layer is necessarily of a black color, which makes marking thereon and the detection of the contents and the position of marks difficult.

In order to solve the problems, it has been suggested to improve a writing ink, but, at the present a satisfactory writing ink has not yet been invented.

In the case of producing a magnetic tape, there can be employed various coating methods such as doctor coating, reverse coating, gravure coating, etc. However, none of these coating methods enables one to completely remove pinholes or the similar drop-out effect encountered in coating. Therefore, it is important to be able to detect pinholes or drop-out in the coating during the production step. In conventional methods as above, the detection thereof by a method utilizing transmitted light is almost impossible due to the backing layer being black. Although there can be employed other detecting methods such as a light reflection method and a magnetic head method, the former has the defect that operation is unstable and the latter has the defect that small pinholes are difficult to detect and, since it is of the contact type, the magnetic tape being inspected is liable to be flawed.

If a product having pinholes or drop-out resulting from coating was sold due to an error in detection, serious problems to the consumer or users would result since good reproduction of signals is impossible.

Therefore, the detection of pin-holes and drop-out is an extremely important matter for magnetic tape manufacturers.

SUMMARY OF THE INVENTION

As a result of extensive investigations to overcome the above-described defects, the inventors have confirmed that the following backing layer enables one to reach this object.

That is, the present invention is characterized in that a magnetic recording layer is provided on one side of a support and, on the opposite side, a backing layer containing: (1) a white and/or a light colored solid powder; (2) carbon black and/or graphite; and (3) a polymeric binder is provided the backing layer transmitting more than 3% of a white light at a thickness of 2 microns, and having a surface electrical resistance of less than $10^{10}\Omega/cm^2$, preferably less than $10^8\Omega/cm^2$.

DETAILED DESCRIPTION OF THE INVENTION

As the plastic film support used in the invention, there can be used polyester films such as polyethylene terephthalate, etc., cellulose derivative films such as cellulose diacetate films, cellulose triacetate films, etc., polyolefin films such as polypropylene films, etc., polycarbonate films, polyvinylidene chloride films, polyimide films, polyamideimide films, and the like; said plastic films having thickness of from about 5 to 50 microns, more preferably about from 10 to 40 microns.

The white or light colored powder, carbon black and graphite are about 0.01 to about 5 microns, preferably 0.1–1 micron, in mean grain size.

As the white powder, zinc oxide, titanium oxide, a mixture of zinc sulfide and barium sulfate, magnesium carbonate, calcium carbonate organic complex of colloidal hydrated aluminum silicate, lead white, titanium white, talc powder, and the like can be used. As is the case with the white powders, the light colored powders are not especially limited, and yellow, red, green, blue and light colors can be used with success. For instance, yellow colored powders such as cadmium yellow, chrome yellow, etc., red colored powders such as cadmium red, red iron oxide, etc., green colored powders such as chrome green, phthalocyanine green, Pigment Green B, chromium dioxide, etc., and blue light colored powders such as ultramarine, Prussian Blue, Phthalocyanine Blue B, etc. Mixtures of white and light colored powders can also be used.

As the polymeric binder used for the recording layer in the present invention, conventionally known thermoplastic resins thermosetting resins (or reaction-type resins or mixtures thereof are used.

As the thermoplastic resins, those having a softening point of less than 150° C., a mean molecular weight of about 10,000 to about 200,000 and a copolymerization degree of about 400 to about 500, such as vinyl chloride-vinyl acetate copolymers, vinyl chloride-vinylidene chloride copolymers, vinyl chloride-acrylonitrile copolymers, acrylate-acrylonitrile copolymers, acrylate, vinylidene chloride copolymers, acrylate-styrene copolymers, methacrylate-acrylonitrile copolymers, methacrylate-vinylidene chloride copolymers, methacrylate-styrene copolymers, urethane elastomers, nylon-silicone resins, nitrocellulose-polyamide resins, polyvinyl fluorides, vinylidene chloride-acrylonitrile copolymers, butadiene-acrylonitrile copolymers, polyamide resins, polyvinyl butyrals, cellulose derivatives, styrene-butadiene copolymers, polyester resins, chlorovinyl ether-acrylate copolymers, amino resins, various synthetic rubber thermoplastic resins, and the like, are used.

Specific examples of such resins are illustrated in Japanese Patent Publications Nos. 6877/62, 12528/64; 19282/64; 5349/65; 20907/65; 9463/66; 14059/66; 16985/66; 6428/67; 11621/67; 4623/68; 15206/68; 2889/69; 17947/69; 18232/69; 14020/70; 14500/70; 18573/72; 22063/72; 22064/72; 22068/72; 22069/72; 22070/72; 27886/72; and the like.

The thermosetting resin or reaction-type resin used preferably has a molecular weight of less than about 200,000 in the state of a coating solution and, upon heating after coating and drying, the molecular weight becomes infinite due to the reaction of condensation, addition, etc. Of these resins, those which are not softened or melted before the thermal condensation are preferred. To be specific, there are, for example, phenol resins, epoxy resins, polyurethane thermosetting-type resins, urea resins, melamine resins, alkyd resins, silicone resins, acrylic reactive resins, epoxy-polyamide resins, nitrocellulose-melamine resins, a mixture of a high molecular weight polyester resin and an isocyanate prepolymer, a mixture of a methacrylate copolymer and a diisocyanate prepolymer, a mixture of a polyester polyol and a polyisocyanate, urea-formaldehyde resins, a mixture of a low molecular weight glycol/high molecular weight diol/triphenyl-methane-isocyanate, polyamide resins and mixtures thereof.

Such resins are illustrated in Japanese Patent Publications Nos. 8103/64; 9779/65; 7192/66; 8016/66; 14275/66; 18179/67; 12081/68; 28023/69; 14501/70; 24902/70; 13103/71; 22065/72; 22066/72; 22067/72; 22072/72; 22073/72; 28045/72; 28048/72; 28922/72; and the like.

The carbon black, graphite or the mixture thereof is used in an amount of about 3 to about 30 parts by weight, preferably 5 to 25 parts by weight, based on 100 parts by weight of the white and/or light colored powder. The white and/or light colored powder, and (2) carbon black and/or graphite are generally present in an amount of from about 80 to about 600 parts by mixed weight, preferably from about 100 to about 400 parts by mixed weight, based on 100 parts by weight of said binder.

The amount of carbon black and graphite used is usually 30-3 parts per 100 parts of the white and/or light colored solid powder. If the amount is less than this range, the surface electric resistance will be increase, while if the amount exceeds the range, there will not be obtained a percent transmittance of above 3%.

As the coating agent, there can be used alcohols having 1-5 carbon atoms, such as ethanol, butanol, isopropyl alcohol, etc.; ketones such as acetone, methyl ethyl ketone, methyl isopropyl ketone, etc.; acetic acid alkyl esters having 1-5 carbon atoms, such as methyl acetate, ethyl acetate, propyl acetate, butyl acetate, amyl acetate, etc.; aromatic hydrocarbons such as benzene, toluene, xylene, etc.; halogenated hydrocarbons such as methylene chloride, ethylene chloride, trichloroethane, tetrahydrofuran, tetrafluoroethylene, etc.; cyclic hydrocarbons such as cyclohexane, cycloheptane, etc.; and mixtures thereof.

To the backing layer may be further added, as optional additives, a lubricant, plasticizer, antistatic agent, etc., to further improve various properties of the backing layer.

As examples of lubricants, there are silicone oils, fluorine-containing oils, waxes, graphite, molybdenum sulfide, tungsten sulfide, fatty acids having from 12 to 18 carbon atoms such as lauric acid, palmitic acid, stearic acid, oleic acid, linolic acid, linoleic acid, etc., fatty acid esters, thereof and the like. Lubricants as are described in Japanese Patent publications No. 23889/68 can be used.

The lubricants are preferably used in an amount of from about 0.2 to about 20 part by weight, based on 100 parts by weight of binder.

As examples of plasticizers, there are dibutyl phthalate, dioctyl phthalate, tricresyl phosphate, dioctyl adipate, etc., most preferred plasticizers having a molecular weight of from about 200 to about 500.

As examples of antistatic agents, there are nonionic surface active agents such as polyoxyethylene alkyl ethers, polyoxyethylene alkyl phenols, polyoxyethylene fatty acid esters, polyoxyethylene alkylamines, polyoxyethylene alkylamides, sorbitan mono-fatty acid esters, polyoxyethylene sorbitan mono-fatty acid esters, polyhydric alcohols, etc.; anionic surface active agents such as alkyl sulfates, alkyl phosphates, etc.; cationic surface active agent such as alkyl pyridinium compounds, quaternary ammonium salts, etc., and the like.

The present transmittance of 3% of the backing layer for a white light, e.g., at 1000 m$\mu$, is the minimum percent transmittance at which non-coated portions (pinholes, drop-out in the coating, etc.) of a magnetizable layer can be detected by observing the magnetizable layer from the side of the backing layer. The percent transmittance is determined by means of a percent transmittance-measuring apparatus (e.g., Photoelectric Colorimeter, Type SG-15, made by Shimazu Seisakusho Ltd.). There is no upper limit with respect to the percent transmittance since the higher the better.

The surface electric resistance of the backing layer is less than $10^{10}\Omega/cm^2$ and most preferably less than $1 \times 10^8 \Omega/cm^2$ but more than $1 \times 10^4 \Omega/cm^2$. If the surface electric resistance is above this value, the antistatic effect is lowered. The carbon black and graphite are added for this antistatic purpose. Also, in the case of using carbon black and graphite in combination, the mixing ratio can be freely selected between 0–100% by weight.

Excellent results are obtained in accordance with the present invention when the dry thickness of the backing layer is from about 0.5 to 5 microns, more preferably from 1 to 4 microns. Values outside the broader range can, of course, be used, but little is to be gained by practice outside the range in view of the excellent results provided within the range.

As the magnetic recording layer to be used in the present invention, any of those known in the art can be used, since the primary features of the present invention reside in the backing layer. For example, those described in Japanese Patent publications Nos. 5301/66; 20386/66; 4622/68; 23892/68; 6309/69; 15507/69; 32005/72; U.S. Pat. Nos. 3,046,158; 3,387,044; 3,625,849; 3,652,334; 3,034,988; 3,068,176; 3,100,194; 3,242,005; 3,498,837; and the like are used with success.

Most typical of the ferromagnetic substances used are $\gamma$-$Fe_2O_3$, Co doped $\gamma$-$Fe_2O_3$, $Fe_3O_4$, Co doped $Fe_3O_4$, $CrO_2$, Fe-Ni alloys, Ni-Co alloys, Fe-Co-Ni alloys, and the like. The mean grain size thereof is usually about 0.05 to 1 micron in commercial products.

The polymeric binder and the coating agent described for the foregoing backing layer may can, of course, be used in the magnetic recording layer.

As to the composition of the magnetic recording layer, a binder is typically used in an amount of 50–180 parts by weight, preferably 70–120 parts by weight, and the coating agent is used in an amount of about 400–1500 parts by weight, based on 300 parts by weight of a ferromagnetic substance, the exact proportions being selected with ease by those skilled in the art depending upon the coating thickness and use.

The present invention will now be described in greater detail by several non-limiting examples.

EXAMPLE 1

A magnetizable layer was provided in a dry thickness of 10 microns on the one side of a 25 micron-thick polyethylene terephthalate base under the usual conditions used for producing video tapes. This magnetizable layer had the following composition:

| | |
|---|---|
| Ferromagnetic substance | 300 parts by weight |
| Vinyl chloride-vinyl acetate* copolymer | 45 parts by weight |
| Epoxy resin (mol. wt. ca 900) | 30 parts by weight |
| Polyamide resin (mol. wt. ca 2,000–6,000) | 30 parts by weight |

*the vinyl chloride-vinyl acetate copolymer illustrated a viscosity of 50–80 centipoise at 25° C. as a 13% wt. % solution in methyl ethyl ketone (40%), toluene (50%) and butanol (10%).

The magnetic substance used was $\gamma$-$Fe_2O_3$ of a 0.4×0.07×0.07 micron grain size. As the binder, a vinyl chloride-vinyl acetate copolymer-epoxy-polyamide resin system was used. The content of the magnetic substance was 37% by volume after drying.

Furthermore, a mixture having the following composition was well dispersed by means of a ball mill and filtered to prepare a coating solution, which was then coated on the opposite side of the tape support in a dry thickness of 2 microns.

| | |
|---|---|
| Zinc oxide (avg. particle size 0.3 $\mu$) | 300 g |
| Vinyl chloride-vinyl acetate copolymer (Denka Vinyl #1000L*) | 35 g |
| Carbon black (avg. particle size 0.03 $\mu$) | 20 g |
| Oleic acid* | 5 g |
| Polyamide resin* | 35 g |
| Epoxy resin* | 25 g |
| Solvent** | 700 g |

*same materials as used in magnetizable layer.
**40% methylethyl ketone, 50% toluene and 10% butanol (weight %).

After delaminating the magnetizable layer of the magnetic tape thus prepared under the above-described conditions, the percent transmittance of the backing layer was measured. The percent transmittance thus obtained was 8% for light having a wave-length of 1000 m$\mu$. Furthermore, the surface electrical resistance of the backing layer was measured as $8\times10^6\Omega/cm^2$. As a result of testing the magnetic tape by mounting it on a 2-inch VTR for use in broadcasting, no electrostatic charging problems were observed.

The percent transmittance of 8% of this tape is extremely useful. The percent transmittance of a backing layer for magnetic tapes now being produced and marketed is almost 0% for light of a 100 m$\mu$ wave-length. Therefore, it is absolutely impossible in the latter case to detect drop-out in coating (locally uncoated portions) of the magnetizable layer in the production step by a method utilizing transmitted light, whereas the detection is made possible in the former in accordance with the present invention.

Thus, the tape of the present invention is extremely advantageous from the viewpoint of production ease. In addition, the tape of the present invention was of a white color, and hence discrimination of marks put on the backing layer with a marking pen for video tape (trade name: Flo-Master, manufactured by Esterbrook Pen Co.) was easily conducted.

EXAMPLE 2

A magnetizable layer having the same composition as in Example 1 was provided in a dry thickness of 10 microns on one side of a 25 micron-thick polyethylene terephthalate base in the normal manner of producing video tapes. The magnetic substance used was $\gamma$-$Fe_2O_3$ of a 0.4×0.07×0.07 micron grain size. As the binder, a vinyl chloride-vinyl acetate copolymer-epoxy-polyamide resin system was used. The content of the magnetic substance was 37% by volume after drying. (same basic layer as Example 1).

Furthermore, the same composition as in Example 1 was applied to the opposite surface of the tape support as a backing layer in a dry thickness of 2 microns the only variation from Example 1 being the use of 30 g of carbon black.

The percent transmittance of the coating-drop-out portions of the magnetizable layer in the thus obtained tape was 5% for light of a 1000 m$\mu$ wave-length, which enabled drop-out to be detected in coating as in Example 1. The surface electrical resistance was $5\times10^6\Omega/cm^2$ and the effect of preventing electrostatic charging of the backing layer in a test by mounting the tape on a VTR was sufficient for practical use.

EXAMPLE 3

The following composition was dispersed well and, after filtration, was coated in a dry thickness of 2 microns on the back surface of the same video tape as was used in Example 1 to replace the backing layer described in Example 1.

| | Weight parts |
|---|---|
| Zinc oxide/titanium oxide (rutile-type) (3/1 weight ratio avg. particle size 0.3 $\mu$ and 0.2 $\mu$, respectively) | 100 |
| Graphite powder (avg. particle size 3.0 $\mu$) | 20 |
| Polyurethane elastomer | 20 |
| Reactive acryl resin | 65 |
| Polyisocyanate | 20 |
| Cyclohexanone/toluene (8/2 weight ratio) | 600 |

The polyurethane elastomer illustrated a viscosity of 30,000 to 70,000 cps (40% resin in methylethyl ketone, 25° C.). The reactive acryl resin illustrated a viscosity of 600 centipoise (30% resin in toluene, 45° C.). The polyisocyanate illustrated a viscosity of 1,500 centipoise (75% resin in toluene, 25° C.).

The surface electrical resistance of the thus prepared backing layer was $7.3 \times 10^7 \Omega/cm^2$, and the percent transmittance thereof for light of a 1000 mμ wavelength was 7%. As a result of testing the tape by mounting it on a 2-inch VTR for use in broadcasting, no problem of electrostatic charging was observed. In addition, discrimination of marks put on the backing layer with a marking pen for video tapes was very easy.

EXAMPLE 4

The following composition was dispersed well in a ball mill, and, after filtration, was coated in a dry thickness of 2 microns on the back surface of a video tape the same as was used in Example 1 to form a different backing layer.

|  | Weight parts |
|---|---|
| Zinc oxide (avg. particle size 0.3 μ) | 100 |
| Carbon black (avg. particle size 0.03 μ) | 10 |
| Polyurethane elastomer (same as Example 3) | 40 |
| Epoxy resin/polyamide resin mixture (7/5 weight ratio) | 45 |
| Mixed solvent | 650 |

The epoxy resin had a molecular weight of 900, while the polyamide resin had molecular weight of 1,000 to 4,000. The mixed solvent comprised 40% methylethyl ketone, 50% toluene and 10% butanol (weight %).

The surface electrical resistance of the thus prepared backing layer was $4.3 \times 10^7 \Omega/cm^2$, and the percent transmittance thereof for light of a 100 mμ wave-length was 7%. As a result of testing the tape by mounting it on a 2-inch VTR for use in broadcasting, no problem of electrostatic charging was observed. In addition, discrimination of marks put on the backing layer with a marking pen for video tapes was very easy.

The backing layer was of a gray color and could be marked with ease as compared with conventional black backing layers. The marking can be discriminated very easily, even during running.

Furthermore, the surface electric resistance is less than $10^8 \Omega/cm^2$, and hence no problem due to electric discharge is encountered experienced in running tests in the mounted state. It is also seen that, since percent transmittance of the backing layer for white light is more than 3%, pinholes can be detected with extreme ease in the production of the tape.

While the invention has been described in detail and with reference to specific embodiments thereof, it will be apparent to one skilled in the art that various changes and modifications can be made therein without departing from the spirit and scope thereof.

What is claimed is:

1. A method of detecting pinholes in the magnetic recording layer of a magnetic recording medium where said medium comprises a plastic film having on one side said magnetic recording layer and, on the opposite side, a backing layer containing (1) a light colored powder selected from the group consisting of ZnO and $TiO_2$ and mixtures thereof, (2) a further substance selected from the group consisting of carbon black, graphite and mixtures thereof in an amount of about 3 to about 30 parts by weight based on 100 parts by weight of said powder; and (3) a polymeric binder, said light colored powder and said further substance being present in an amount of from about 80 to 600 parts by mixed weight, based on 100 parts by weight of said binder, said backing layer being from 0.5 to 5 microns in dry thickness and transmitting more than 3% of white light at a thickness of 2 microns and said backing layer having a surface electrical resistance of less than $10^{10} \Omega/cm^2$, said method comprising transmitting light through said recording medium so that said pinholes can be detected.

2. A method as in claim 1 where said surface electrical resistance is more than $1 \times 10^4 \Omega/cm^2$ and less than $1 \times 10^8 \Omega/cm^2$.

3. A method as in claim 1 wherein said light is 1,000 millimicrons of wave-length.

4. A method as in claim 1 where said further substance is present in an amount of about 5 to about 25 parts by weight based on 100 parts by weight of said powder.

5. A method as in claim 1 where said light colored powder and said further substance are present in an amount of from about 100 to 400 parts by mixed weight based on 100 parts by weight of said binder.

6. A method as in claim 1 where said further substance is present in an amount of about 5 to about 25 parts by weight based on 100 parts by weight of said powder and where said light colored powder and said further substance are present in an amount of from about 100 to 400 parts by mixed weight based on 100 parts by weight of said binder.

* * * * *